Patented Aug. 30, 1927.

1,641,114

UNITED STATES PATENT OFFICE.

LEWIS B. CARLSON, OF BOSTON, MASSACHUSETTS, ASSIGNOR TO S. A. WOODS MACHINE COMPANY, OF SOUTH BOSTON, MASSACHUSETTS, A CORPORATION OF MASSACHUSETTS.

RADIAL SETTING GAUGE.

Application filed December 15, 1923. Serial No. 680,878.

My present invention relates to gauges, and more particularly to a radial setting gauge for cutterhead knives.

In Patent No. 846,723 granted March 12, 1907, to Charles W. H. Blood, there is described and claimed an improved radial setting gauge for cutterhead knives in which extreme accuracy in the setting of the knives is obtained, the principle under which such patent operates being to preliminarily arrange the cutting knives outward to a greater extent than they will be ultimately set and then move the gauge into engagement with the cutting edge of such knives which forces them inward with respect to the cutterhead to a predetermined distance from the center of rotation of such cutterhead. The means by which this accurate setting is performed is arranged on a radially extending frame which accurately adjusts the cutting knives to the same radial distance from the center of the cutterhead irrespective of the accuracy of the faces of the cutterhead and of the position which the edges of the knife occupy with relation to the body of the knives.

My present invention is designed to be an improvement over that shown and described in the Patent 846,723 above referred to and has for its primary object the retaining of the accuracy of adjustment found in the said patent while permitting a greater range of action than was found in such patent. The radial setting gauge of the patent was limited in its use to practically one size of cutterhead, it being necessary, therefore, to arrange a radial setting gauge for practically each size of cutterhead employed. This necessitated a multiplicity of gauges which was objectionable, particularly in a relatively small shop because of the expense involved. In my present invention I have provided means for quickly and accurately setting the cutting edge of a knife on a cutterhead in predetermined and accurate relation to the center of rotation of the cutterhead and my device is capable of application to a plurality of different sizes of cutterheads.

In accomplishing my object, I provide an auxiliary rotatable frame mounted on the adjusting frame, which auxiliary rotatable frame may be swung about its pivot point to allow for different sizes of cutting circle cut out by the knives in a cutterhead.

Figure 1:
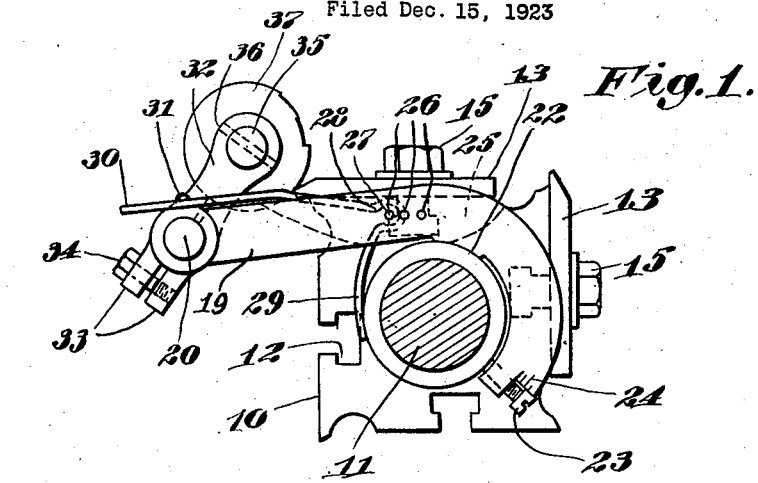
Figure 2:
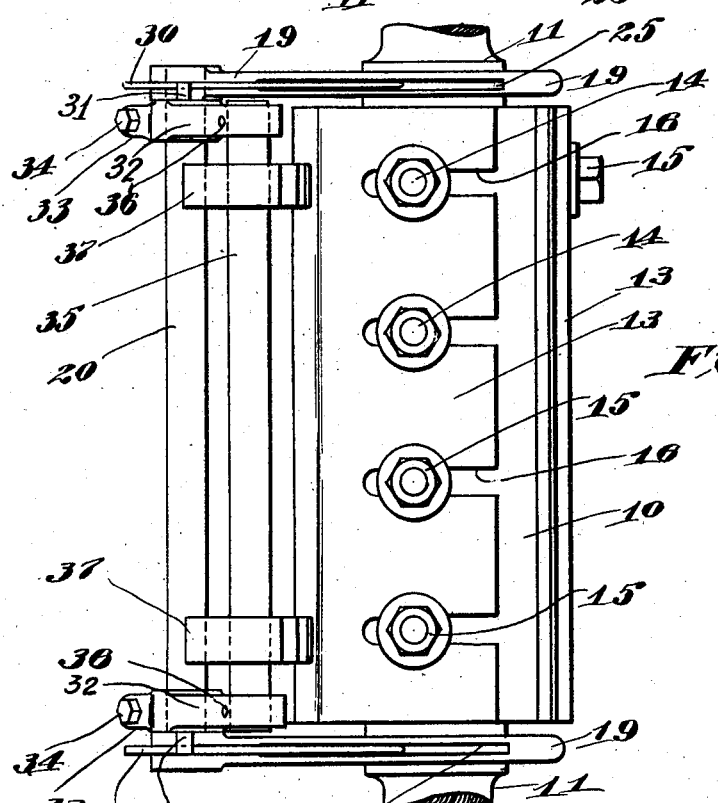

In the accompanying drawings illustrating the preferred embodiment of my invention, Fig. 1 is a view in end elevation of a cutterhead showing my setting gauge applied thereto, the carrying shaft therefor being shown in section, and Fig. 2 is a plan view of Fig. 1.

Referring to the drawings, 10 designates a cutterhead secured to a shaft 11, the cutterhead being approximately square in end elevation, as shown in Fig. 1, and in each face of the cutter head is formed a T groove 12 that extends throughout the length of the head. Secured to each face of the cutterhead are knives 13, such knives being secured by T bolts 14 that fit in the T grooves 12 and by nuts 15 that screw onto such T bolts. The knives 13 are provided with slots 16 which permit adjustment of the knives 13 with respect to the faces of the cutterhead.

Numeral 19 designates arms spaced apart from each other and secured at one end to a rod or shaft 20. These arms 19 at the end remote from their connection with the shaft 20 are curved and the under edges of the curved portion are provided with a bearing surface 22 and at their extreme end are drilled and tapped to allow passage therethrough of an adjusting screw 23, the arm 19 being provided with graduations 24 which, with the adjusting screw 23, forms practically a micrometer adjusting arrangement for the arms. The length of the shaft 20 is such that the bearing surfaces 22 and the inner end of the adjusting screw 23 bear on the shaft 11 at each end of the cutterhead 10. The arms 19 and shaft 20 constitute a frame having means for supporting itself on a shaft or other device. Each of the arms 19 is provided on its top edge with a slot 25 and in the arms 19 transversely of the slot 25 are arranged a plurality of perforations 26 in which may be inserted a pin 27. Passing through each of the slots 25 is a spring member provided with an eye or loop 28 through which may pass the pin 27. This spring member is provided with a downwardly extending yielding portion 29 that engages with the shaft 11 and is also provided with a portion 30 that extends outward parallel to the arm 19. Provided on the arm 19 is a lip 31 and under which lip the end 30 of the spring engages, as clearly shown in the drawings. The yielding portion 29 of the spring cooperates with the bearing surface 22 and with the inner end of the adjusting screw 23 to form practically a three point suspension for each of the arms 19 and acts to quickly, positively, and accurately center the framework comprised of the arms 19 and shaft 20 on the shaft 11 and with relation to the cutterhead 10. The shaft 20 with the arms 19 and the parts carried by the latter constitute the main frame of the gauge.

Rotatably mounted on the shaft 20 adjacent each of the arms 19, as clearly shown in Fig. 2, is a bearing arm 32, the end of such arm adjacent the shaft 20 being provided with lugs 33 adapted to receive a bolt 34 and by means of which the arms 32 may be securely clamped in adjusted position on such shaft 20. The end of the arms 32 remote from the lugs 33 are drilled to receive a shaft 35, which shaft is secured to the arms 32 by pins 36 and the shaft 35 is arranged to lie parallel with the shaft 20 and, because of the means provided for holding the arms 19 on the shaft 11, such shaft 35 is maintained parallel to the shaft 11. Mounted for rotatable and slidable movement on the shaft 35 are devices 37 having an arc surface concentric to the shaft 35, this surface being of sufficient length for the purpose to be hereinafter described, and preferably such devices have the form of a complete roll or wheel. The rolls 37 may be slid along the shaft 35 for different widths of knives 13 or to test the accuracy of grinding of any knife. The bearing arms 32 and shaft 35 constitute an auxiliary frame.

In operating my improved device, the operator grasps in his hands the opposite ends of the arms 19 and releases the ends 30 of the springs to permit the yielding ends 29 thereof to be moved from the shaft 11 at the opposite ends of the cutter head 10. He then drops the arms so as to bring the bearing surfaces 22 and the ends of the adjusting screws 23 into engagement with the shaft 11 and depresses the ends 30 of the spring so as to force the yielding portion 29 thereof into engagement with the shaft 11. The ends 30 are brought under the lips on the ends of the ears 31. The bearing surfaces 22, adjusting screws 23, and yielding spring ends 29 hold the device accurately in position with respect to the cutterhead 10 and on the shaft 11. Should it become necessary to adjust the device, this may be done by means of the adjusting screws 23. The bolts 34 are slacked off to permit rotation of the frame comprised of the arms 32 and shaft 35 into position to bring the rolls 37 into gauging position with the knives 13 on the cutterhead 10, after which the bolts 34 are tightened up in the lugs 33. The knives 13 to be adjusted on the cutterhead 10 are moved on the faces of the cutter head 10 to such a degree as to have their cutting edge extend radially outward from the center of rotation of the shaft 11 a greater distance than they will have when in proper position and the knives 13 are loosely held in such position by means of the T bolts 14 and nuts 15. The operator now grasps the arms 19 and rotates the entire device about the shaft 11, bringing the peripheral face of the members 37 into engagement with the bevel of the cutting edge of the knives 13 and this action forces the cutting edge of such loosely held knives radially inward with respect to the center of the shaft 11. The knives will be properly positioned when the contact points between the same and the members 37 are in the plane of the axes of the shafts 35 and 11. After the setting operation, the nuts 15 are screwed onto the T bolts 14 to clamp the cutting knives 13 in adjusted position. It being possible to swing the framework comprised of the arms 32 and shaft 35 about the shaft 20 as a center, it will be apparent that my device is capable of use in connection with a large number of different sized cutting heads 10 and that accurate adjustment of the knives on any sized cutterhead within the capacity of the device is quickly, positively, and accurately performed.

While I have necessarily shown and described the preferred embodiment of my invention somewhat in detail, it is to be understood that I may vary the size, shape, and arrangement of parts within wide limits without departing from the spirit of the invention.

Having thus described my invention, what I claim as new is:

1. A setting gauge for cutter head knives, said gauge comprising a main frame having three-point suspension means whereby the frame is adapted to be rotatably mounted on the cutter head shaft, an auxiliary frame mounted on said main frame for adjustment relative thereto about an axis parallel to said shaft and having members affording edge-engaging surfaces which are adapted to be moved towards or from the axis of said shaft as a result of such adjustment, the entire gauge being movable about the axis of the shaft, by virtue of the three-point suspension, for engaging and moving radially a cutting edge.

2. A setting gauge for cutter head knives, said gauge comprising a main frame, means for yieldingly and rotatably holding said frame in position on the shaft of the cutter head, an auxiliary frame mounted on said main frame for adjustment about an axis parallel to said shaft, edge-engaging devices carried by said auxiliary frame and adjustable therewith so as to vary their distance from the cutter head shaft, the entire gauge being rotatable about the axis of said shaft, whereby the cutting edge of a knife on the cutter head will be moved radially inward with respect to the center of said shaft.

In testimony whereof, I have signed my name to this specification.

LEWIS B. CARLSON.